US011596970B2

(12) United States Patent
Pressey

(10) Patent No.: US 11,596,970 B2
(45) Date of Patent: Mar. 7, 2023

(54) LATERAL APPLICATOR KIT FOR A PIPE

(71) Applicant: Tool Den, Pemberton, NJ (US)

(72) Inventor: Dennis Alexander Pressey, Pemberton, NJ (US)

(73) Assignee: TOOL DEN, Pemberton, NJ (US)

( * ) Notice: Subject to any disclaimer, the term of this patent is extended or adjusted under 35 U.S.C. 154(b) by 0 days.

(21) Appl. No.: 17/367,297

(22) Filed: Jul. 2, 2021

(65) Prior Publication Data

US 2021/0331195 A1  Oct. 28, 2021

Related U.S. Application Data

(63) Continuation-in-part of application No. 17/119,963, filed on Dec. 11, 2020, now Pat. No. 11,071,995.

(60) Provisional application No. 62/947,725, filed on Dec. 13, 2019.

(51) Int. Cl.
| B05C 9/04 | (2006.01) |
| B05C 17/10 | (2006.01) |
| B65D 47/04 | (2006.01) |
| B05C 7/08 | (2006.01) |
| F16L 58/02 | (2006.01) |
| B05C 17/00 | (2006.01) |
| B05D 7/22 | (2006.01) |

(52) U.S. Cl.
CPC ............... *B05C 9/045* (2013.01); *B05C 7/08* (2013.01); *B05C 17/00* (2013.01); *B05C 17/10* (2013.01); *B05D 7/225* (2013.01); *B65D 47/043* (2013.01); *F16L 58/02* (2013.01); *B05D 2254/06* (2013.01)

(58) Field of Classification Search
CPC ........... B05C 9/045; B05C 7/08; B05C 17/10; B05C 17/00; B05C 1/022; B05C 1/027; B05C 7/00; B05C 7/06; B65D 47/043; F16L 58/02; Y10S 118/10; Y10S 118/11; Y10S 118/13; B05D 7/225; B05D 2254/06; B05D 2254/02; B05D 2254/04
USPC ........................................................ 118/214
See application file for complete search history.

(56) References Cited

U.S. PATENT DOCUMENTS

| 4,063,827 | A | * | 12/1977 | Persson | ..................... | F16N 3/02 |
| | | | | | | 401/199 |
| 5,678,684 | A | * | 10/1997 | Wright | ..................... | B44D 3/12 |
| | | | | | | 220/731 |
| 5,743,667 | A | * | 4/1998 | Osborne | ............... | B05C 17/002 |
| | | | | | | 401/281 |

(Continued)

*Primary Examiner* — Laura Edwards

(57) ABSTRACT

A lateral applicator kit for a pipe has a first and a second application unit that are configured to apply a primer material or other substance to the exterior and interior lateral walls of a pipe. The first unit receives primer through a first supply engagement feature, which is in fluid communication with a first material reservoir internal to the first application unit and further in fluid communication with an application receptacle configured to receive, and apply primer to, the exterior lateral surface of a pipe. The application receptacle has at least one first material applicator connected across at least one first application opening through which primer is absorbed and distributed to the pipe. The application receptacle has a tapered, flexible applicator wall for adaptably accommodating a range of pipe diameters. The second unit is similarly but inversely configured to adaptably apply primer to the interior surface of a fitting.

17 Claims, 8 Drawing Sheets

(56) References Cited

U.S. PATENT DOCUMENTS

2009/0019680 A1* 1/2009 Krohn .................... F16L 17/00
29/272
2014/0237800 A1* 8/2014 Drees ....................... C09D 7/61
29/458

* cited by examiner

LATERAL APPLICATOR KIT FOR A PIPE

The current application is a continuation-in-part (CIP) application of a U.S. non-provisional application Ser. No. 17/119,963 filed on Dec. 11, 2020. The U.S. non-provisional application Ser. No. 17/119,963 claims a priority to a U.S. provisional application Ser. No. 62/947,725 filed on Dec. 13, 2019.

FIELD OF THE INVENTION

The present invention relates generally to applicator tools. More particularly, the present invention relates to a kit for applying a substance to the surfaces of a pipe.

BACKGROUND OF THE INVENTION

Polyvinyl Chloride (PVC) is the world's third most widely produced synthetic plastic polymer and it is favorable in the production of pipes, hoses, medical devices, and plenty of other household materials. PVC was first synthesized in 1872 and commercially produced in the 1920s, a timeline older than most other plastics available today. The production of this plastic is viable in two counterparts, rigid and flexible, allowing both pipes and hoses to originate from the same material.

During the assemblage of a pipe, multiple segments of PVC of various different shapes and sizes are utilized: elbows (curved at different angles), crosses, tees (fitting with three ends), etc. These are necessary for the pipe to accommodate into the space for which it is intended. These segments are joined at their ends, elongating or changing the direction of the pipe so it can perform its proper function. These pipes will most likely be subjected to intense pressures, highlighting the importance of securely joining the segments together to prevent bursting or ruptures. This is where proper priming of the joints becomes crucial.

When connecting two segments of PVC together tightly enough to withstand significant pressure, the application of a primer is necessary. The use of a primer connects the pipes via a chemical weld, a process where the chemical (primer) softens the pipe, allowing the introduction of pressure applied by the individual to chemically fuse the two pipes together. Without the use of a primer, the PVC pipe will fail to seal properly, creating a fragile structure susceptible to ruptures and bursts. The primer also serves a related purpose of evening out bumps and cracks, along with removing oils, dirt, and other imperfections from the pipes so a proper seal is formed.

Application of the primer is a challenge that requires optimization. The primer comes stored in a can, and is applied by a built-in dauber or brush. Due to the runny consistency of the primer, the dauber fails to mitigate the mess that is created when handling it, and drip prevention is nearly impossible to achieve. To make matters worse, skin contact with the primer can be extremely hazardous, potentially leading to a painful, itchy rash, while repeated exposure can lead to a skin disease called dermatosis. Furthermore, if the primer drips onto unintended surfaces, it proves extremely difficult to remove, especially if it sits on the surface for some time. This will potentially require the disposal of the stained material, where clothing is among the most common victim of primer stain.

When applying the primer, the dauber does not solve the problem of achieving an even and consistent coat around the exterior and interior of the pipes to be adhered. The first contact between the dauber and the pipe will be the point on the pipe at which the most primer is applied. As you brush through the circumference of the pipe, less and less primer will remain on the dauber, leading to a spectrum of primer concentration around the pipe. One consequence introduced by this problem is not having enough primer applied to the area where there is a small crack, and thus not covering it sufficiently to prevent future damage to the pipe. Another consequence is the mess that can occur from using a dauber or brush to apply the primer.

While there is a method to apply the primer to a PVC pipe, the success rate of this process can be dramatically improved, the time necessary for the application can be reduced, and the drip of the primer onto other surfaces at the risk of stains can and should be eliminated. Accordingly, there is an established need for an all-in-one, multi-functional priming tool that is able to apply prime material to both the interior and exterior surfaces of a pipe.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
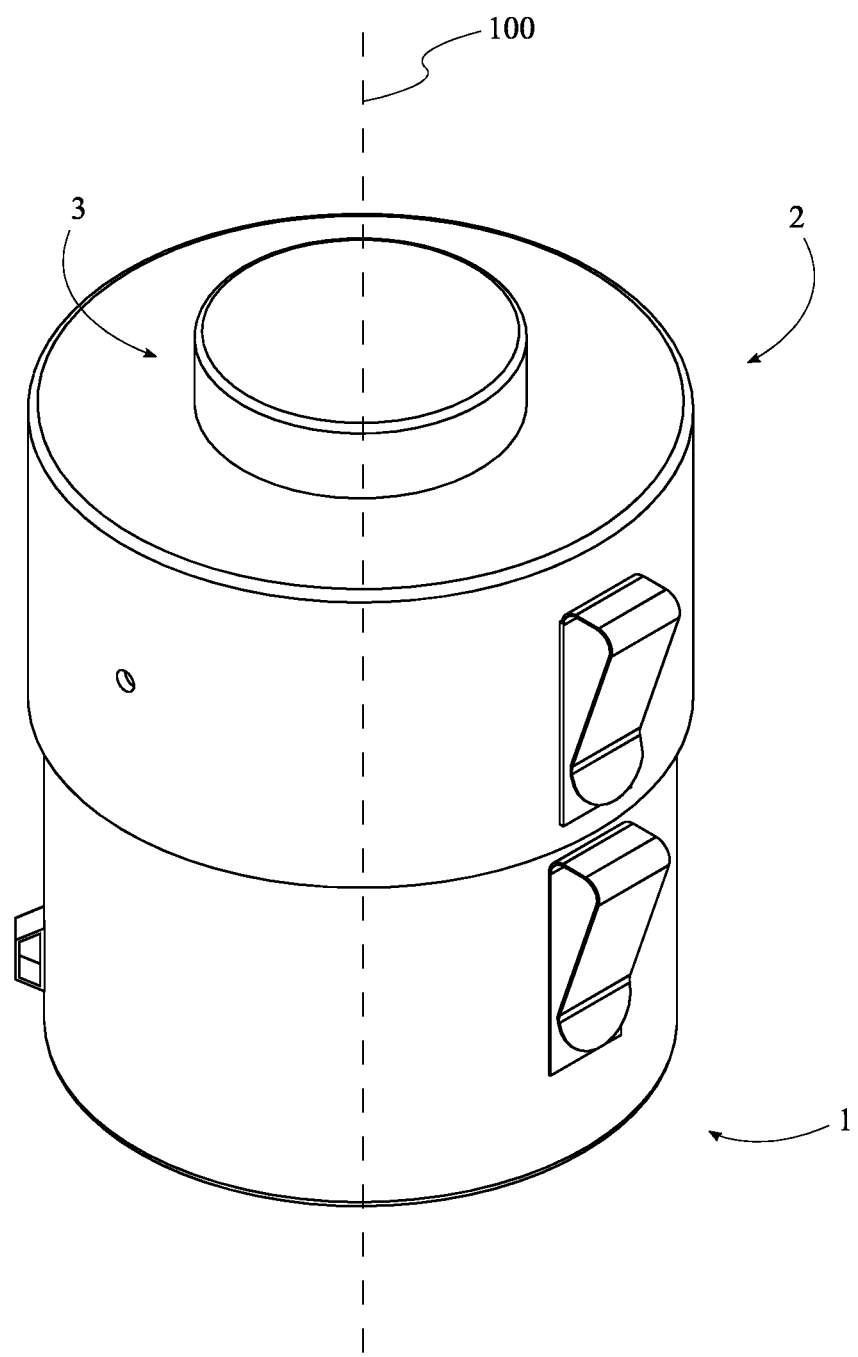
FIG. 1 is a perspective view of the present invention in an assembled configuration.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used herein, specify the presence of stated features, steps, operations, elements, various embodiments, and/or components, but do not preclude the presence or addition of one or more other features, steps, operations, elements, various embodiments, components, and/or groups thereof.

Unless otherwise defined, all terms (including technical and scientific terms) used herein have the same meaning as commonly understood by one having ordinary skill in the art to which this invention belongs. It will be further understood that terms, such as those used in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, embodiments and/or steps are disclosed. Each of these has individual benefit and each can also be used in conjunction with one or more, or in some cases all, of the other disclosed techniques, embodiments and/or steps. Accordingly, for the sake of clarity, this description will refrain from repeating every possible combination of the individual steps, techniques or embodiments in an unnecessary fashion. Nevertheless, the specification and claims should be read with the understanding that such combinations are entirely within the scope of the invention and the claims.

Lateral applicator kits for pipes, apparatuses, fabrications, methods of manufacture and assembly and various qualities are discussed herein. In the following description, for purposes of explanation, numerous specific details are set forth in order to provide a thorough understanding of the present invention. It will be evident however, to one skilled in the art, that the present invention may be practiced with or without these details.

The present disclosure is to be considered as an exemplification of the invention, and it is not intended to limit the invention to the specific embodiments illustrated by the figures or descriptions.

The present invention is a tool kit for applying a substance to the interior and exterior lateral surfaces of a pipe. More particularly, the present invention is a lateral applicator kit intended to facilitate application of a coating of a viscous substance, such as, but not limited to, PVC primer, glue, or other material to the interior and exterior lateral surface of a PVC pipe before an adhesive layer is applied in order to chemically weld the ends of two PVC pipes together. It should be readily understood, however, that the present invention may be alternatively directed to a substance application tool that applies any substance, such as a cleaner, adhesive, paint, and/or any other substance, to the interior, exterior, and in some embodiments, terminal surfaces of a PVC pipe or any other applicable type of pipe. Generally, throughout, primer will be referred to, but it should be understood that any of the aforementioned substances or any other substance may be substituted in various embodiments. In some instances, the present invention may be referred to as "Primer Pal."

The lateral applicator kit of the present invention is deployed in the form of a pair of individual tool units—a first application unit 1 being configured with a radial cavity adapted to receive and apply primer material to an exterior lateral surface of a pipe and a second application unit 2 being configured with a radial male applicator member adapted to be inserted into and apply primer to an interior lateral surface of a pipe fitting. Each of the pair of tool units has a primer supply connection being disposed in fluid communication internally through the tool units with the lateral walls of the respective primer application features of the tool units. A third application unit may further be comprised in some embodiments, wherein the third application unit may correspond to a dauber cap 3 typically included with canisters of primer or other such substances, and wherein the third application unit may be configured to concentrically and terminally connect to either of the pair of tool units.

Figure 2:
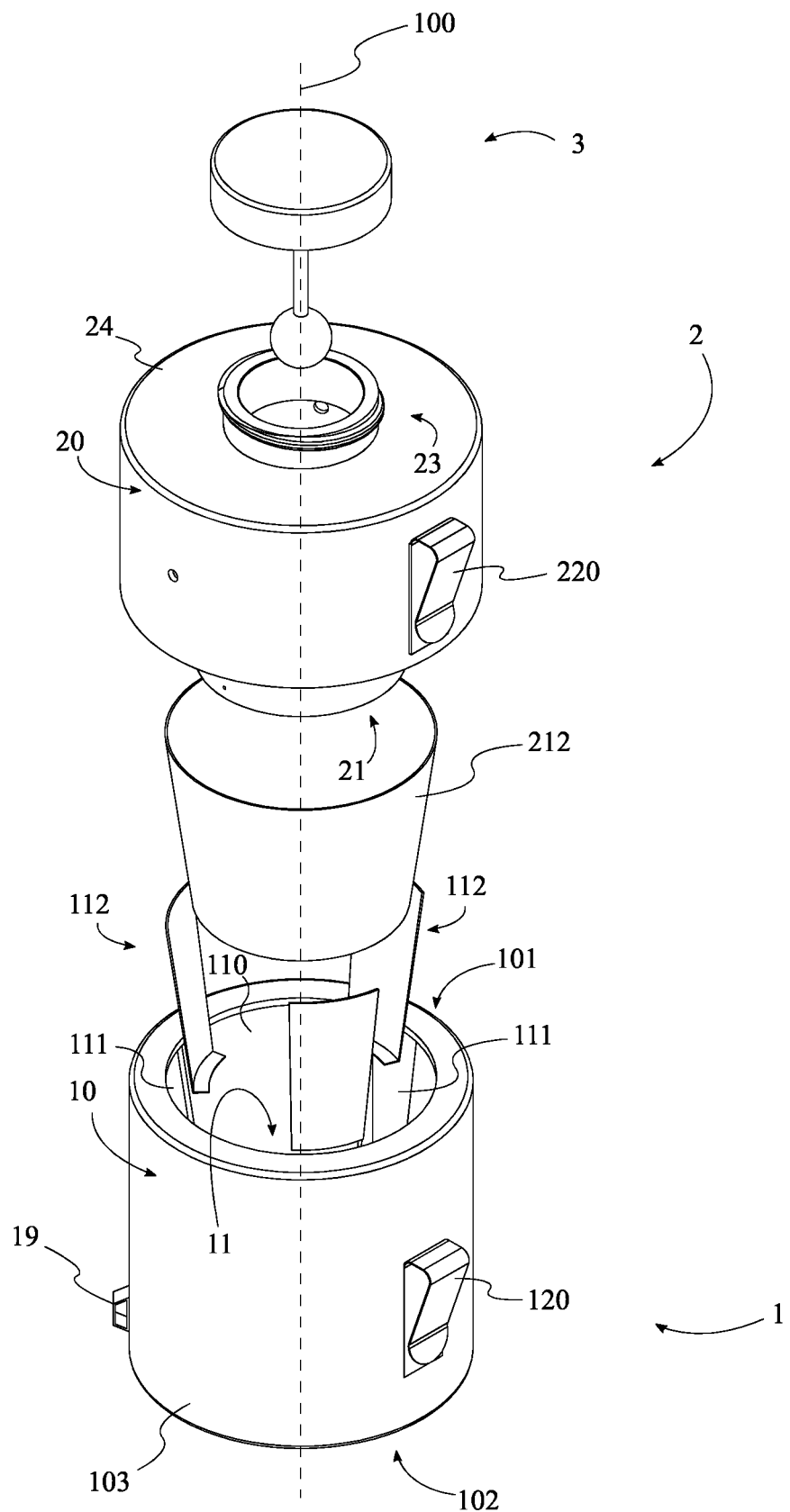
FIG. 2 is a perspective exploded view of the present invention.

Generally, referring to FIGS. 1-2, the preferred embodiment of the lateral applicator kit of the present invention comprises a first application unit 1 and a second application unit 2, wherein the first application unit 1 is configured to apply primer material to an exterior lateral surface of a pipe or fitting, while the second application unit 2 is configured to apply primer material to an interior lateral surface of a pipe or fitting. The first application unit 1 and the second application unit 2 each have generally radial geometry concentrically positioned about a central axis 100. In the preferred embodiment, the first application unit 1 and the second application unit 2 are configured to be removably interfit or joined with one another to form a single compact assembly, which facilitates storage, packaging, and transport of the lateral applicator kit. The present invention may be sized to any desired dimensions in order to accommodate any size of pipe or pipe fitting.

Referring to FIGS. 1-6, in the preferred embodiment of the present invention, the first application unit 1 generally comprises a first unit housing 10, an application receptacle 11, a first unit material reservoir 12, and a first unit supply engagement feature 13. Generally, throughout, components with the nomenclature of "first unit [component]" or "second unit [component]" denote that the component belongs to the first application unit 1 or the second application unit 2, respectively. The first unit housing 10 of the first application unit 1 generally constitutes the external structural geometry of the first application unit 1 and serves to support and connect the remaining components of the first application unit 1.

The application receptacle 11 is a broadly defined sub-component of the first application unit 1, such that the application receptacle 11 is configured to internally receive the end of a pipe in order to apply primer to the external lateral wall of the pipe through lateral contact between the lateral wall of the pipe and the application receptacle 11. The application receptacle 11 is integrated into the first unit housing 10.

The first unit supply engagement feature 13 is integrated into the first unit housing 10; more particularly, the first unit supply engagement feature 13 is integrated into a bottom 102 of the first unit housing 10, axially opposite the application receptacle 11 along the central axis 100 of the first application unit 1. In the preferred embodiment, the first unit supply engagement feature 13 is adapted to engage a pre-existing canister of primer or another substance in order to receive the primer, which is then supplied to the application receptacle 11.

The first unit material reservoir 12 is a cavity or other substantially empty space positioned within the first unit housing 10 between the first unit supply engagement feature 13 and the application receptacle 11, and functions to contain a reservoir of primer, glue, or other applicable material to be applied to the exterior lateral surface of a pipe.

In the preferred embodiment of the present invention, the application receptacle 11 comprises a first unit applicator wall 110, at least one first unit application opening 111, at least one first unit material applicator 112, and a receptacle base 113.

The first unit applicator wall 110 is perimetrically positioned to the receptacle base 113, opposite the first unit supply engagement feature 13. In some embodiments, the receptacle base 113 is a solid, flat bottom of the application receptacle 11, and in some embodiments, the receptacle base 113 may extend downward away from the application receptacle 11 toward the first unit supply engagement feature 13. The receptacle base 113 is a structural component necessary to contain the primer within the first unit housing 10. In some embodiments, the receptacle base 113 may comprise a removable plug in order to allow primer or other material to pass through the receptacle base 113.

The first unit applicator wall 110 serves to deliver the primer material to the exterior lateral surface of the pipe. In the preferred embodiment, the first unit applicator wall 110 is constructed of a flexible material, such that the application receptacle 11 is configured to adaptably receive an exterior lateral surface of a pipe. More particularly, the first unit applicator wall 110 is tapered outward from the receptacle base 113 toward a top 101 of the first unit housing 10. The tapered geometry and flexible material of the first unit applicator wall 110 allows the first unit applicator wall 110 to flex outward in order to variably and adaptably accommodate a variety of pipe sizes, up to and including the maximum diameter of the first unit applicator wall 110 at the top 101 of the first unit housing 10. This configuration enables a tight fit between the exterior lateral surface of the pipe and the application receptacle 11, since in order to fully insert the pipe into the application receptacle 11, the pipe must deform the first unit applicator wall 110 from its tapered configuration outward into a straight cylindrical shape to match the exterior cylindrical shape of the pipe.

Each of the at least one first unit application opening 111 traverses through the first unit applicator wall 110. The specific shape and placement of the at least one first unit application opening 111 may vary in different embodiments, but in the preferred embodiment, each of the at least one first unit application opening 111 generally has a vertically oriented slot shape. Further, in the preferred embodiment, the at least one first unit application opening 111 is radially distributed about the central axis 100 of the first application unit 1 in order to evenly distribute primer about the exterior lateral surface of a pipe.

Further, each of the at least one first unit material applicator 112 is positioned across one of the at least one first unit application opening 111, such that each first unit application opening 111 is entirely occluded by one of the at least one first unit material applicator 112. In some embodiments, the at least one first unit material applicator 112 may be permanently affixed across the at least one first unit application opening 111 through various means, such as, but not limited to, glue or epoxy, or the at least one first unit material applicator 112 may be removably attached across the at least one first unit application opening 111. In the preferred embodiment, however, the at least one first unit material applicator 112 is removably attached across the at least one first unit application opening 111 through any suitable means, such as, but not limited to, fasteners such as clips or snaps, various mating retaining features of the first unit material applicators 112 and other relevant structures, such as the first unit applicator wall 110, or other means. In some embodiments, each of the at least one first unit material applicator 112 may comprise attachment portions which are configured to extend through the first unit application opening 111 and be inserted into retaining slots situated behind the first unit applicator wall 110 within the first unit material reservoir 12, for example. In various embodiments, any suitable attachment means may be utilized to affix the at least one first unit material applicator 112 across the at least one first unit application opening 111.

Figure 3:
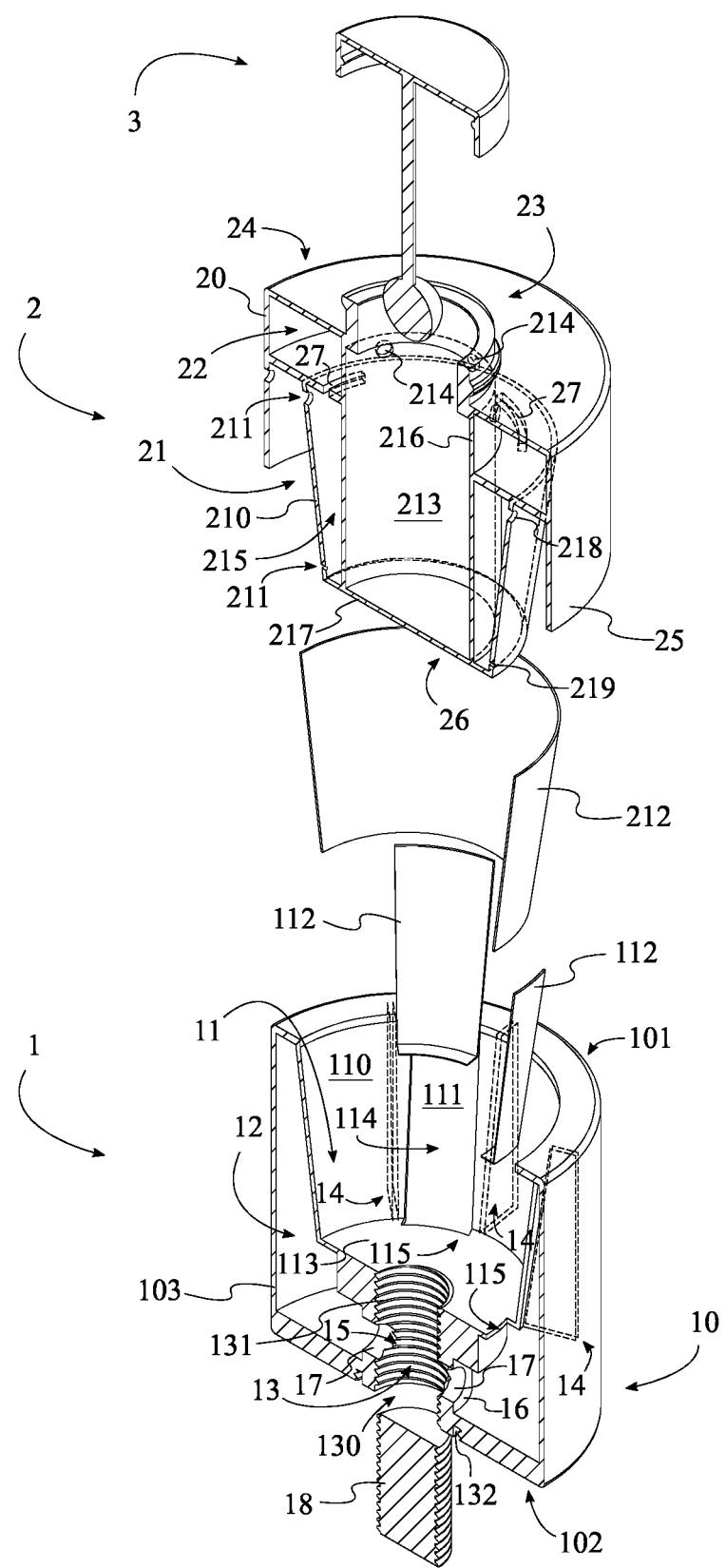
FIG. 3 is a perspective exploded cross-sectional view of the present invention.
Figure 4:
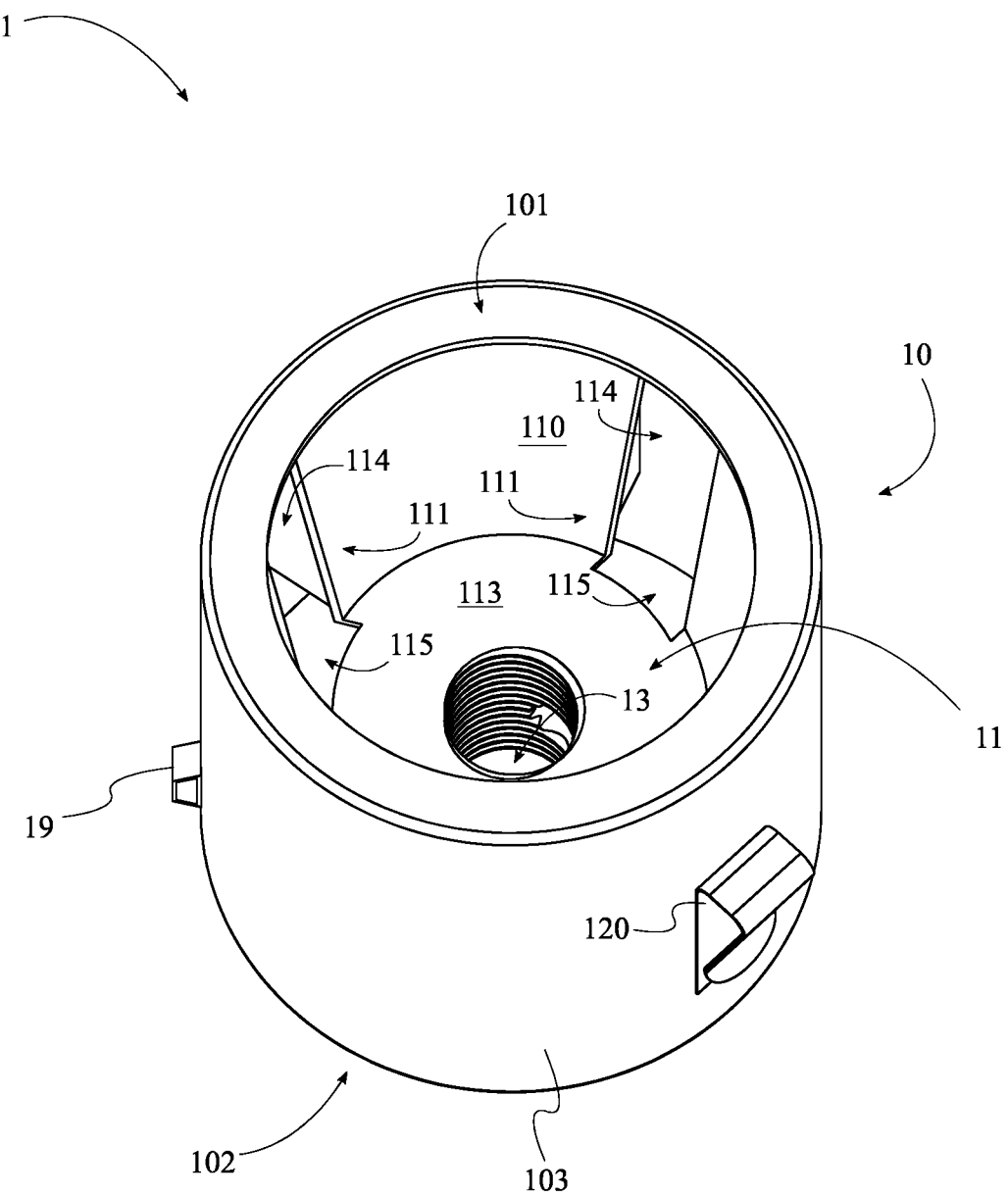
FIG. 4 is a raised perspective view of the first application unit of the present invention.
Figure 5:
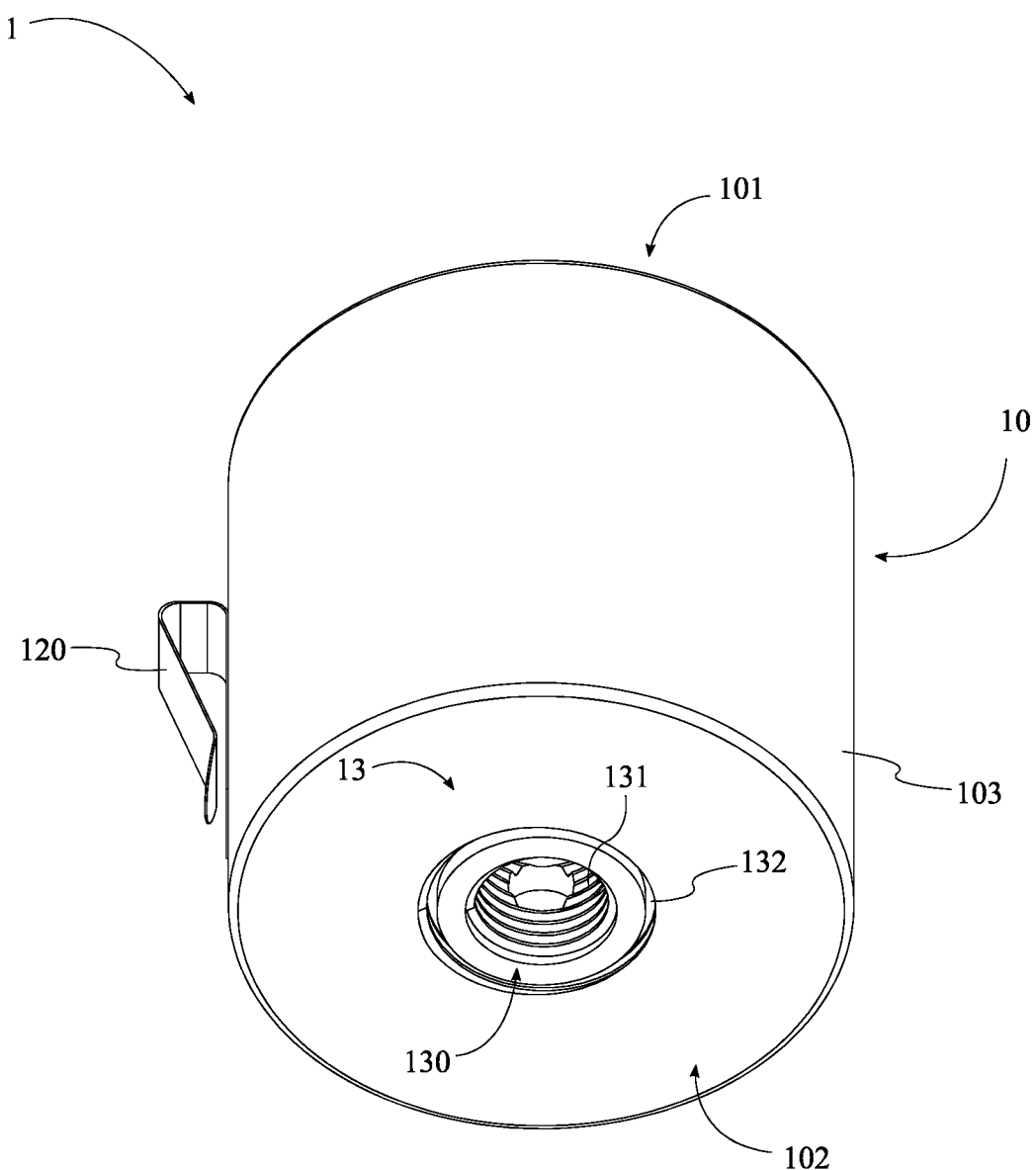
FIG. 5 is a lowered perspective view of the first application unit of the present invention.
Figure 6:
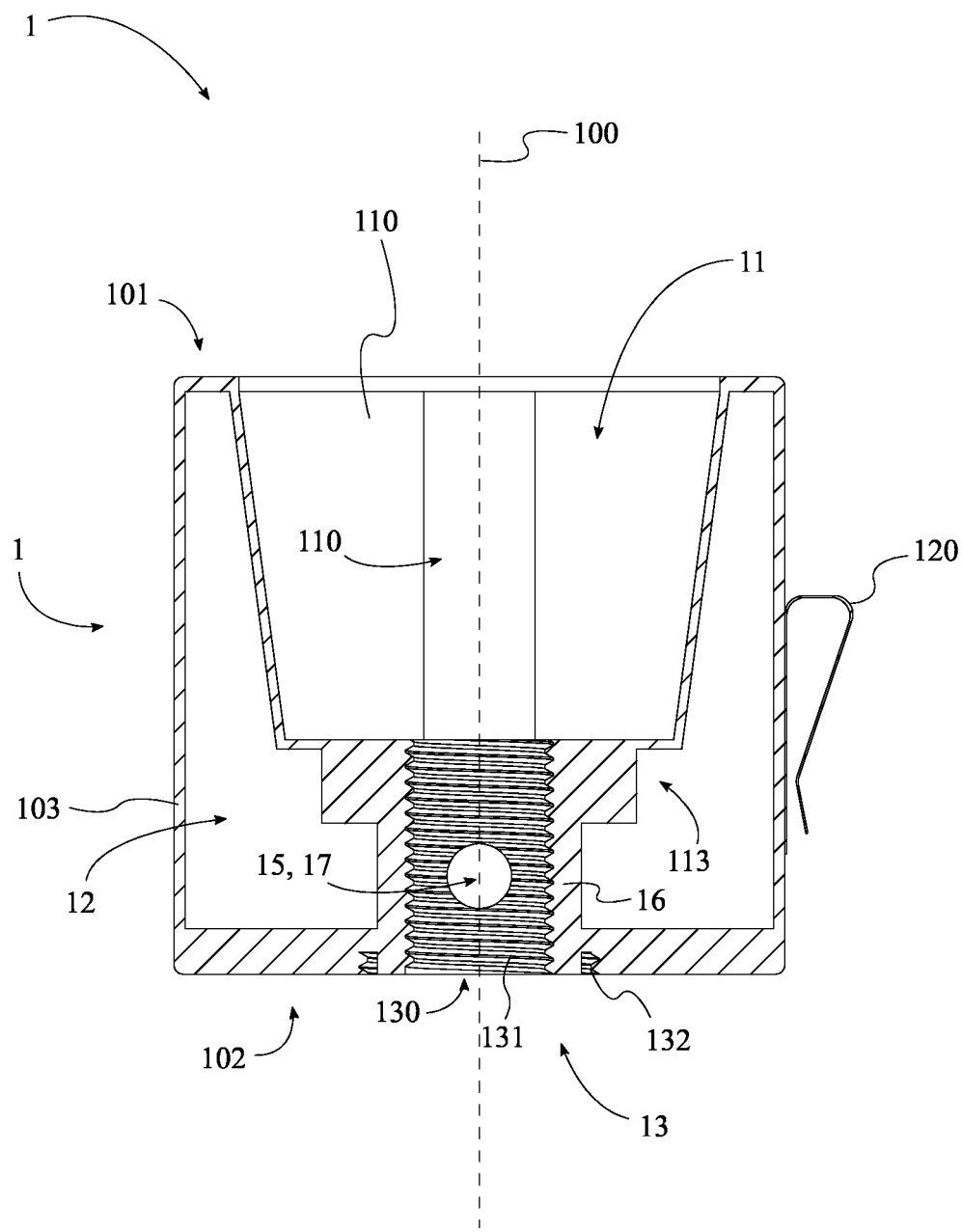
FIG. 6 is a cross-sectional plan view of the first application unit of the present invention.
Figure 7:
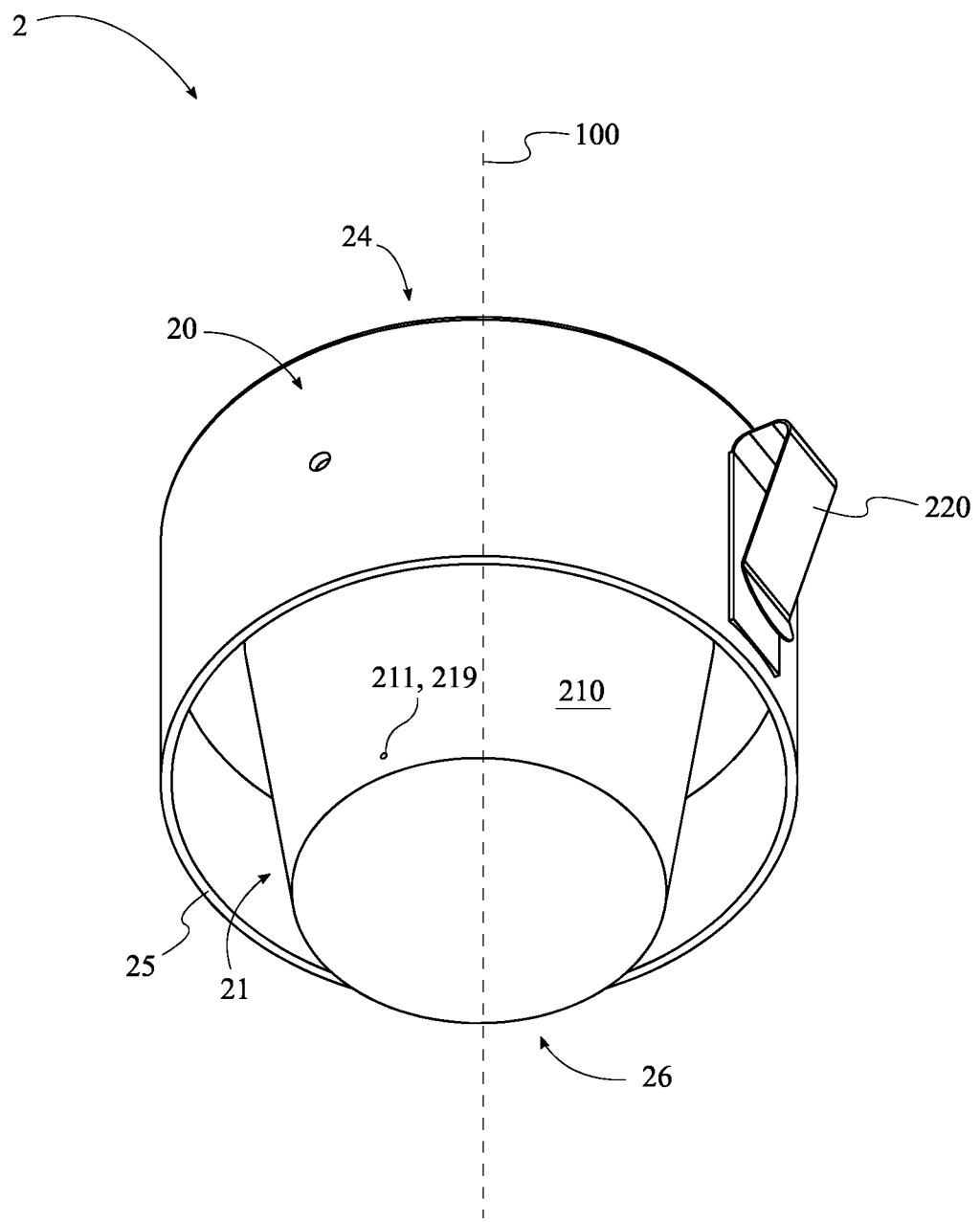
FIG. 7 is a lowered perspective view of the second application unit of the present invention.
Figure 8:
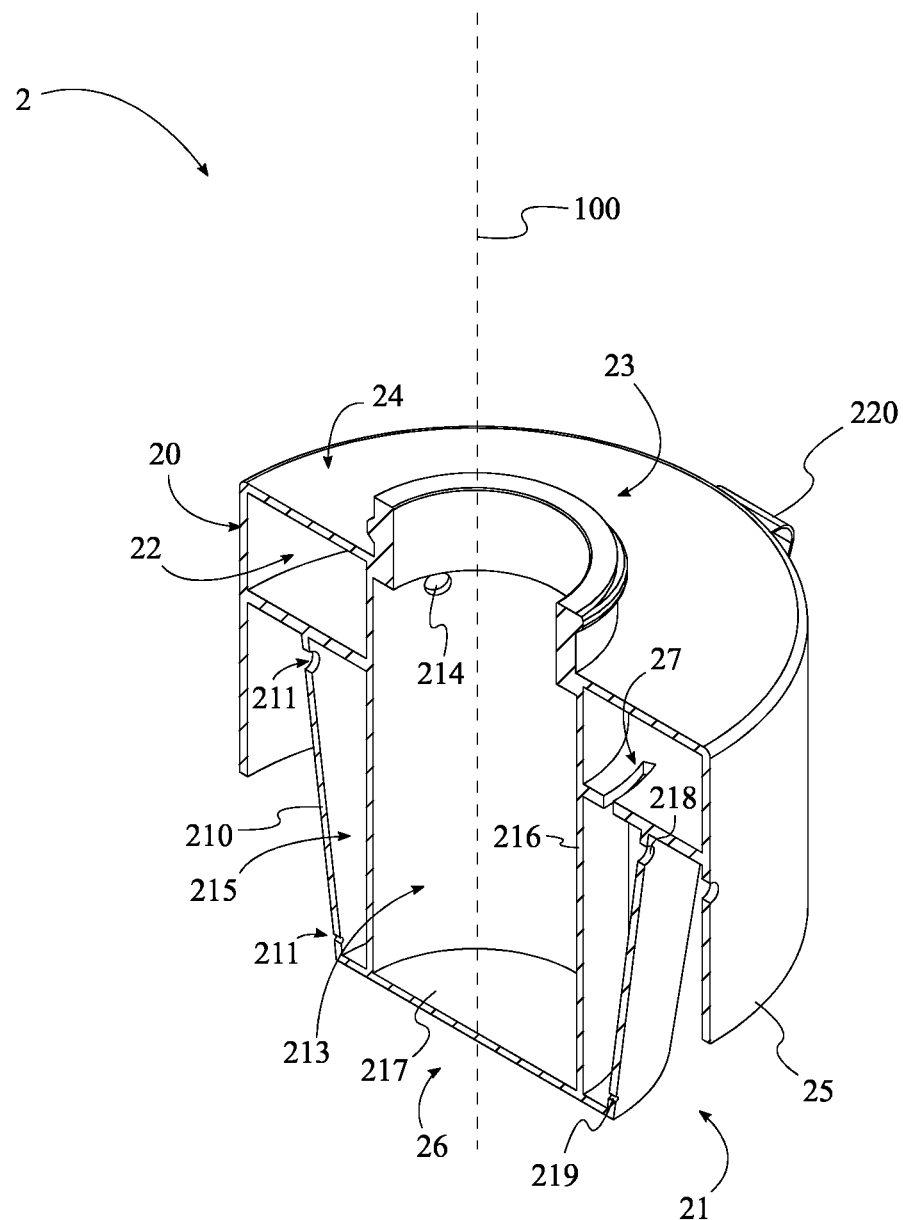
FIG. 8 is a raised perspective cross-sectional view of the second application unit of the present invention.

In some embodiments, each of the at least one first unit application opening 111 comprises a lateral portion 114 and a terminal portion 115, as shown in FIGS. 3 and 4. The lateral portion 114 traverses laterally through the first unit applicator wall 110 and is generally responsible for the bulk of the present invention's intended purpose in applying primer to the exterior lateral surface of a pipe. The terminal portion 115 traverses through the receptacle base 113, and in use will apply a coating of primer to a terminal end of the pipe in additional to the exterior lateral surface of the pipe, such that the coating of primer on the terminal end of the pipe functions as a visual indicator ring viewable by the user.

In the preferred embodiment, each of the at least one first unit material applicator 112 is constructed from constructed from a flexible, absorbent and/or porous material, such as, but not limited to, felt or a similar textile or other absorbent material. However, the material of the at least one first unit material applicator 112 may vary as desired in various embodiments. The purpose of the at least one first unit material applicator 112 is to absorb primer or other applicable material from the first unit material reservoir 12 within the first unit housing 10 and transfer said material through absorption to the lateral interior of the application receptacle 11 in order to apply the material to the lateral external surface of a pipe. The at least one first unit material applicator 112 may function in whole or in part through a wicking action, absorbing primer from one side of the first unit material applicator 112 and transferring the primer across the thickness, height, or other relevant dimension of the first unit material applicator 112 through capillary action to the external lateral surface of the pipe externally positioned adjacent to and within the application receptacle 11. Each first unit material applicator 112 absorbs primer delivered from the first unit material reservoir 12 of the first application unit 1, and the absorbed primer is transferred laterally through the first unit material applicators 112 in order to evenly distribute primer onto the exterior lateral surface of a pipe.

Alternatively, in some embodiments, wherein the present invention may be known as a "Glue Buddy" embodiment, the at least one first unit material applicator 112 is not an absorbent piece of fabric-like material such as felt, but rather is configured with a physical structure such as a plurality of perforations which is more conducive to transferring substances such as glue which are more viscous than primer.

Further, in some embodiments, the first application unit 1 further comprises at least one pair of internal baffles 14, as shown in FIG. 3. Each of the at least one pair of internal baffles 14 is positioned within the first unit material reservoir 12 and adjacent to one of the at least one first unit application opening 111. Preferably, each of the at least one pair of internal baffles 14 extends between the first unit applicator wall 110 and the first unit housing 10. Further, in some embodiments, each of the at least one pair of internal baffles 14 extends vertically between the top 101 and bottom 102 of the first unit housing 10, and generally functions to direct primer flow to contact the at least one first unit material applicator 112 adjacent to the receptacle base 113 of the application receptacle 11, such that the primer is generally wicked directionally from a lower end of the at least one first unit material applicator 112 adjacent to the receptacle base 113 toward an upper end of the at least one first unit material applicator 112 adjacent to the top 101 of the first unit housing 10. In embodiments where the at least one pair of internal baffles 14 extends all the way vertically to the bottom 102 of the first unit housing 10, each of the at least one pair of internal baffles 14 may additionally comprise one or more lateral apertures in order to allow primer material to flow laterally past the baffles within the first unit material reservoir 12. Alternatively, in some embodiments, the at least one pair of internal baffles 14 may be replaced with or simply function as internal structural bracing and may not be effectively involved in directing fluid flow within the first unit material reservoir 12.

Further, the first unit supply engagement feature 13 is in fluid communication with each of the at least one first unit application opening 111 through the first unit material reservoir 12, passing through the interior of the first unit housing 10 in order to reach the at least one first unit application opening 111 and subsequently be transferred to the exterior lateral surface of a pipe through the at least one first unit material applicator 112.

Alternatively stated, primer received through the first unit supply engagement feature 13 follows an internal fluid path through the first unit housing 10 and arrives at the application receptacle 11, where the primer traverses through the at least one first unit application opening 111 and makes contact with the external lateral surface of the pipe positioned within the application receptacle 11.

Further, in some embodiments, such as the aforementioned Glue Buddy embodiment, the first application unit 1 may be partially or entirely constructed of a flexible material, such as, but not limited to, Polyethylene Terephthalate (PET), High-Density Polyethylene (HDPE), Low-Density Polyethylene (HDPE), Polypropylene (PP), Thermoplastic Polyurethane (TPU), or any other suitable flexible material. It is contemplated that in some embodiments, such as the aforementioned Glue Buddy embodiment, it may be desirable for the first application unit 1 to be flexible when applying materials with high viscosity such as various gluing compounds, so that the user is enabled to apply compressive force to the outer shell 103 in order to increase the pressure within the first unit material reservoir 12, thus forcefully squeezing the glue or other viscous material through the first unit application openings 111 and first unit material applicators 112 of the application receptacle 11 in order to forcefully apply the viscous material to the lateral exterior surface of a pipe. Additionally, in some embodiments, the second application unit 2 may likewise be constructed of such a flexible material for similar purposes.

In the preferred embodiment, the first unit housing 10 comprises a top 101, a bottom 102, and an outer shell 103. The outer shell 103 is perimetrically connected between the top 101 and the bottom 102 and is preferably a hollow cylindrical wall. The application receptacle 11 is integrated into the top 101, and the first unit supply engagement feature 13 of the first application unit 1 is integrated into the bottom 102 of the first unit housing 10. As previously stated, the first unit applicator wall 110 is tapered outwardly toward the top 101 of the first unit housing 10 from the receptacle base 113, such that an upper diameter of the first unit applicator wall 110 adjacent to the top 101 of the first unit housing 10 is larger than a lower diameter of the first unit applicator wall 110 adjacent to the receptacle base 113.

Moreover, in the preferred embodiment the first unit supply engagement feature 13 of the first application unit 1 comprises a first unit supply opening 130, an internal threading 131, and an annular recess 132. The internal threading 131 is integrated into the bottom 102, and the first unit supply opening 130 traverses through the internal threading 131. Further, the annular recess 132 traverses into the bottom 102, around the internal threading 131. The internal threading 131 and the annular recess 132 are adapted to mate with a typical pre-existing container of primer or similar material. It should be noted that the specified arrangement of the internal threading 131 and annular recess 132 are not to be considered limiting to all embodiments of the present invention, and other arrangements may be comprised in different embodiments in order to adequately engage with any other configuration of material supply container 213 or supply system.

As previously disclosed, in the preferred embodiment of the present invention, the first application unit 1 further comprises a first unit material reservoir 12. The first unit material reservoir 12 is positioned within the first unit housing 10, such that the first unit supply engagement feature 13 is disposed in fluid communication with the application receptacle 11 through the first unit material reservoir 12. More particularly, the first unit material reservoir 12 is concentrically positioned around the application receptacle 11 within the first unit housing 10, such that primer contained within the first unit material reservoir 12 is free to flow adjacent to the at least one first unit material applicator 112 in order to deliver primer to the exterior lateral surface of a pipe.

Moreover, in some embodiments, the first application unit 1 further comprises a first unit supply cavity 15 in addition to the first unit material reservoir 12. The first unit supply cavity 15 is positioned between the first unit supply engagement feature 13 and the solid base, and the first unit supply cavity 15 is disposed in fluid communication with the first unit material reservoir 12. The first unit supply cavity 15 is positioned directly adjacent to the first unit supply engagement feature 13, while the first unit material reservoir 12 is positioned concentrically around the first unit supply engagement feature 13 and the application receptacle 11. A supply lateral wall 16 concentrically delineates the first unit supply cavity 15, wherein the supply lateral wall 16 is concentrically positioned around the first unit supply engagement feature 13 within the first unit housing 10 and is axially connected between the bottom 102 of the first application unit 1 and the solid base of the application receptacle 11. One or more supply apertures 17 traverse laterally through the supply lateral wall 16 from the first unit supply cavity 15 into the first unit material reservoir 12. Thus, primer received through the first unit supply engagement feature 13 may flow into the first unit supply cavity 15, through the supply apertures 17, into the first unit material reservoir 12, and adjacent to the at least one first unit material applicator 112, where it is absorbed by the at least one first unit material applicator 112 and transferred thereby to the exterior lateral surface of a pipe positioned within the application receptacle 11 and laterally abutted against the at least one first unit application opening 111.

In some embodiments, the present invention may further comprise a plugging means in order to occlude the first unit supply engagement feature 13 while a primer supply canister is not connected to the first unit supply engagement feature 13, and otherwise regulate the flow of primer through the first unit supply engagement feature 13.

More particularly, in some embodiments, referring to FIG. 3, the first unit supply engagement feature 13 traverses through the receptacle base 113, and a supply plug 18 is adjustably engaged within the first unit supply engagement feature 13, such that the supply plug 18 is configured to regulate material flow through the first unit supply engagement feature 13. In some embodiments, the first unit supply engagement feature 13 is internally threaded as previously mentioned, while the supply plug 18 is externally threaded. Thus, the supply plug 18 may be threadedly engaged within the first unit supply engagement feature 13, such that rotation of the supply plug 18 within the first unit supply engagement feature 13 linearly translates the supply plug 18 within the first unit supply engagement feature 13 along the central axis 100 of the first application unit 1.

In some embodiments, the first unit supply engagement feature 13 traverses continuously from the bottom 102 of the first unit housing 10, through the first unit supply cavity 15, and through the receptacle base 113, emerging into the application receptacle 11 of the first application unit 1, wherein the aforementioned supply apertures 17 laterally traverse through the first unit supply engagement feature 13 between the bottom 102 of the housing and the receptacle base 113 into the first unit material reservoir 12, such that the first unit supply engagement feature 13 acts as the aforementioned supply lateral wall 16. Alternatively, in some embodiments, the first unit supply engagement feature 13 may comprise a lower portion and an upper portion, with the lower portion traversing through the bottom 102 of the first unit housing 10, and the upper portion traversing through the receptacle base 113. The supply plug 18 may have sufficient axial length to engage within both the upper portion and the lower portion, such that the supply plug 18 may be selectively engaged with the upper portion only, the lower portion only, or both the upper portion and the lower portion simultaneously, or some intermediary variation thereof.

Depending on the position of the supply plug 18 within the first unit supply engagement feature 13, the supply plug 18 may partially or entirely occlude the supply apertures 17 of the first unit supply cavity 15, or any similar structural arrangement whereby primer may follow a fluid path through the bottom 102 of the first unit housing 10 into the first unit material reservoir 12. Thus, the supply plug 18 may be utilized to regulate the flow of primer through the first unit supply engagement feature 13 into the first unit material reservoir 12 by restricting the effective cross-sectional area of the fluid path through the first unit supply engagement feature 13.

Furthermore, in some embodiments, the application receptacle 11 of the first application unit 1 may be further adapted toward the ability to receive and apply primer to multiple sizes of pipe with the same individual unit. To this end, in some embodiments, the application receptacle 11 may comprise a plurality of application tiers, each application tier comprising its own first unit applicator wall 110, at least one first unit application opening 111, and at least one first unit material applicator 112, as previously described. This is not necessarily a requirement, however, and may be considered an optional expansion of the existing application receptacle 11 feature. For example, in one embodiment, the application receptacle 11 may comprise a first application tier and a second application tier, such that the first application tier has a larger maximum diameter than the second application tier. In such an embodiment, the first application tier is perimetrically and concentrically connected to the top 101 of the first unit housing 10, and the second application tier is perimetrically and concentrically connected between the first application tier and the receptacle base 113.

In such embodiments having multiple application tiers of the application receptacle 11, each application tier should be different in maximum and/or minimum diameter, and the application tiers should be connected axially adjacent to each other in series, progressing from the smallest maximum or minimum diameter at the receptacle base 113 to the largest maximum and/or minimum diameter adjacent to the top 101 of the first unit housing 10, generally forming a stepped cone shape.

The first application tier and the second application tier may be embodied with any desired diameters and taper angles, though in various embodiments, the maximum and/or minimum diameters of the first application tier and the second application tier should be selected in order to receive and apply primer to pipes 4 with common diameters of PVC pipes. For example, in some embodiments, the first application tier may have a maximum or minimum diameter of one inch, while the second application tier may have a maximum or minimum diameter of two inches. In various embodiments, the diameters of the first application tier and the second application tier, or any such application tier belonging to a group of a generalized plurality of application tiers, may be selected in order to accommodate any size pipe or pipe fitting as desired. Further, it should be noted that in such embodiments, the quantity of application tiers should not be limited to two, and any desired quantity of application tiers may be comprised.

Further, in the preferred embodiment, the first application unit 1 comprises at least one clip attachment 19. The at least one clip attachment 19 is externally connected to the first unit housing 10, preferably adjacent to the bottom 102, though the position of the at least one clip attachment 19 may vary on the first unit housing 10. The at least one clip attachment 19 may further vary in geometry in different embodiments, but should generally form a closed loop in order to enable a user to attach a clip to the at least one clip attachment 19 in order to store or carry the first application unit 1. Additionally or alternatively, the first application unit 1 may comprise a carry clip 120 which may resemble a pocket clip or similar structure, enabling the user to temporarily affix the first application unit 1 onto their belt, pocket, or waistband in order to carry the first application unit 1 while not in active use.

As previously described, the second application unit 2 of the present invention is configured as a counterpart to the first application unit 1, wherein the first application unit 1 is adapted to apply primer to the exterior lateral surface of a pipe, whereas the second application unit 2 is adapted to apply primer to the interior lateral surface of a pipe. When a first pipe portion and a second pipe portion (or a pipe and a joint or connector piece) are joined together, by necessity, the outer diameter of a first pipe portion must be sized to produce a friction fit with the inner diameter of a second pipe portion, wherein primer is applied to the exterior lateral surface of the first pipe portion and to the interior lateral surface of the second pipe portion. Therefore, it is desirable in various instances to configure the first application unit 1 to apply primer (or adhesive, or another substance) to the exterior lateral surface of a pipe with a specified outer diameter, and the second application unit 2 to apply primer to the interior lateral surface of a pipe or pipe fitting with a specified inner diameter, wherein the specified outer diameter and the specified inner diameter are roughly equal.

However, this is not necessarily considered to be a strict requirement in all embodiments of the present invention.

In the preferred embodiment, referring to FIGS. 1-3 and 7-8, the second application unit 2, or fitting unit, generally comprises a second unit housing 20, an application body 21, a second unit material reservoir 22, and a second unit supply engagement feature 23. Additionally, in some embodiments the second application unit 2 may further comprise a carry clip 220 similar to the carry clip 120 of the first application unit 1.

Similar to the first unit housing 10 of the first application unit 1, the second unit housing 20 of the second application unit 2 generally constitutes the external structural geometry of the second application unit 2 and serves to support and connect the remaining components of the second application unit 2.

The second unit supply engagement feature 23 is integrated with the second unit housing 20. Moreover, the second unit supply engagement feature 23 of the second application unit 2 is concentrically integrated into an end of the second unit housing 20—more particularly, a top 24 of the second unit housing 20—and may function and be configured similarly to the first unit supply engagement feature 13 of the first application unit 1. In some embodiments, the second unit supply engagement feature 23 of the second application unit 2 may comprise an external threading configured to threadedly receive a dauber cap 3.

In the preferred embodiment, the application body 21 of the second application unit 2 comprises a second unit applicator wall 210, at least one second unit application opening 211, and at least one second unit material applicator 212. The application body 21 is the component of the second application unit 2 that inversely corresponds to the application receptacle 11 of the first application unit 1, in that the application body 21 is the physical structure of the second application unit 2 responsible for distributing primer material onto the interior lateral surface of a pipe fitting. In the preferred embodiment, the application body 21 is connected to the second unit housing 20, opposite the second unit supply engagement feature 23.

Each of the at least one second unit application opening 211 traverses through the second unit applicator wall 210, and each of the at least one second unit material applicator 212 is positioned across one of the at least one second unit application opening 211.

Similarly to the at least one first unit material applicator 112 of the first application unit 1, the at least one second unit material applicator 212 absorbs primer delivered from the second unit material reservoir 22 of the second application unit 2, and the absorbed primer is transferred laterally through the at least one second unit material applicator 212 in order to evenly distribute primer onto the interior lateral surface of a pipe or pipe fitting.

Further, each of the at least one second unit material applicator 212 may be constructed of an absorbent material in some embodiments, or provided with a physical structure, such as, but not limited to, a plurality of perforations, whereby the second unit material applicator 212 may be configured to transfer more viscous material such as glue in other embodiments, such as in the aforementioned "Glue Buddy" embodiment.

Similar to the application receptacle 11 of the first application unit 1, the application body 21 of the second application unit 2 of the present invention is preferably constructed of a flexible material and has a tapered radial profile, allowing the application body 21 to adapt to various inner diameters of pipes pipe fittings.

The second unit material reservoir 22 is positioned within the second unit housing 20. The second unit material reservoir 22 may be understood herein as a cylindrical cavity serves a similar function as the first unit material reservoir 12 of the first application unit 1; that is, to receive primer and distribute the primer through various fluid passageways in order to ultimately apply primer to the interior lateral surface of a pipe or pipe fitting through the application body 21; more specifically, through the at least one second unit application opening 211 and the at least one second unit material applicator 212 of the application body 21. Thus, the second unit supply engagement feature 23 is in fluid communication with each of the at least one second unit application opening 211 through the second unit material reservoir 22.

In the preferred embodiment, the second application unit 2 further comprises a top 24 and an outer annular wall 25. The outer annular wall 25 is perimetrically connected to the top 24 of the second application unit 2 around the second unit material reservoir 22 and the application body 21. The outer annular wall 25 of the second application unit 2 preferably has a slightly larger diameter than the outer shell 103 of the first unit housing 10 of the first application unit 1, such that the outer annular wall 25 of the second application unit 2 is configured to sleeve the outer shell 103 of the first application unit 1.

In the preferred embodiment, the application body 21 of the second application unit 2 further comprises a supply container 213, a plurality of distributing supply holes 214, and a distributing cavity 215.

Preferably, the supply container 213 is a hollow structure internal to the housing and/or the application body 21 in various embodiments as desired. Preferably, the second unit supply engagement feature 23 is in direct, concentric fluid communication with the supply container 213, such that primer material poured through the second unit supply engagement feature 23 lands and accumulates within the supply container 213.

Further, the second unit material reservoir 22 is positioned around the supply container 213 adjacent to the second unit supply engagement feature 23, and the plurality of distributing supply holes 214 traverses through the supply container 213 into the second unit material reservoir 22. The top 24 as previously mentioned is positioned adjacent to the second unit supply engagement feature 23, and a lower end 26 of the second application unit 2 being terminally positioned adjacent to the application body 21, opposite the second unit supply engagement feature 23, such that the second application unit 2 extends along the central axis 100 of the second application unit 2 from the second unit supply engagement feature 23 adjacent to the top 24, downward to the smaller tapered end of the application body 21 adjacent to the lower end 26.

In some embodiments, the second unit material reservoir 22 is positioned adjacent to the top 24, while the supply cavity centrally traverses through the second unit material reservoir 22, continuing downward past the second unit material reservoir 22 and terminating at the lower end 26 of the second application unit 2. Thus, in the preferred embodiment, the second unit material reservoir 22 is positioned between the top 24 and the distributing cavity 215 of the application body 21. The supply cavity is generally separated from the second unit material reservoir 22 by a supply container wall 216, through which the plurality of distributing supply holes 214 passes.

It may be recognized, therefore, that in the preferred embodiment, the supply container 213 thus acts as an intermediary material reservoir in the fluid path between the second unit supply engagement feature 23 and the second unit material reservoir 22. In order for primer to pass through from the supply cavity, through the plurality of distributing supply holes 214, and into the second unit material reservoir 22, assuming the second application unit 2 is oriented in an upright position, primer must vertically accumulate to fill the empty space of the supply container 213 until the level of primer reaches the plurality of distributing supply holes 214 near the top 24 end of the second application unit 2, such that the primer material spills through the plurality of distributing supply holes 214 into the second unit material reservoir 22.

Further, in the preferred embodiment, the distributing cavity 215 is positioned concentrically between the second unit applicator wall 210 and the supply container 213, axially adjacent to the second unit material reservoir 22 opposite the second unit supply engagement feature 23. Further, the second unit material reservoir 22 is in fluid communication with the distributing cavity 215. More specifically, a plurality of distributing apertures 27 traverse through a base or floor of the second unit material reservoir 22 into the distributing cavity 215, wherein the plurality of distributing apertures 27 may be radially distributed about the central axis 100 of the second application unit 2. Thus, after spilling from the supply container 213 through the plurality of distributing supply holes 214 into the second unit material reservoir 22, primer material then spills through the plurality of distributing apertures 27 from the second unit material reservoir 22 into the distributing cavity 215.

Further, in the preferred embodiment, the application body 21 further comprises an applicator bottom 217, positioned adjacent to the aforementioned lower end 26, axially opposite the second unit material reservoir 22 along the second application wall, such that the distributing cavity 215 extends between the second unit material reservoir 22 and the applicator bottom 217. Further, in the preferred embodiment, the at least one second unit application opening 211 comprises at least one upper opening 218 and at least one lower opening 219. The at least one upper opening 218 is positioned adjacent to the second unit material reservoir 22, and the at least one lower opening 219 is positioned adjacent to the applicator bottom 217. Thus, the at least one second unit material applicator 212 is positioned across the at least one upper opening 218 and the at least one lower opening 219, absorbing or otherwise receiving primer material through the at least one upper opening 218 and the at least one lower opening 219, and exposing said primer material to be applied to the internal lateral surface of a pipe or pipe fitting into which the application body 21 is inserted, abutting the at least one second unit material applicator 212 against the interior lateral surface of the fitting and thus applying the primer material to the interior lateral surface of the fitting. In some embodiments, the at least one second unit material applicator 212 is an applicator sleeve, having fully circumferential geometry and configured to slide over the application body 21. In some embodiments, the at least one second unit material applicator 212 may comprise a plurality of applicator segments which may be permanently or removably affixed to the second unit applicator wall 210 through any suitable means.

Thus, the second unit material reservoir 22 is in fluid communication with the distributing cavity 215, wherein the second unit supply engagement feature 23 is in fluid communication with the at least one second unit application opening 211 through the supply cavity, the plurality of distributing supply holes 214, the second unit material reservoir 22, and the distributing cavity 215.

Alternatively stated, as the supply cavity is filled with primer through the second unit supply engagement feature 23, the primer spills through the plurality of distributing supply holes 214 into the second unit material reservoir 22, where the primer further spills through the plurality of distributing apertures 27 in the floor of the second unit material reservoir 22 into the distributing cavity 215, where the primer initially passes through the at least one lower opening 219 and may eventually fill the distributing cavity 215 to a sufficient height to additionally pass through the at least one upper opening 218. It is further noted that while the aforementioned description depends on the force of gravity to spill primer through the various aforementioned fluid passages, a user may simply upend, rotate or otherwise physically manipulate the orientation of the second application unit 2 in order to encourage primer along the aforementioned fluid path.

It should be noted, however, that this arrangement is not considered a requirement, and alternative fluid paths from the second unit supply engagement feature 23 to the second unit applicator wall 210 of the application body 21 may be enabled through any other suitable geometric arrangements.

Finally, as an ancillary feature, the present invention may further comprise at least one deburring tool. The deburring tool may be generally understood to comprise at least one blade or sharp edge, which the user may utilize to shave burrs or other irregularities from the terminal edge of a pipe. The deburring tool may be connected externally or internally to either the first application unit 1 or the second application unit 2 as desired, and may be positioned in any suitable location. Further, the deburring tool may utilize any currently known or new configuration of components to achieve the known functionality of a deburring tool. In some embodiments, the deburring tool is annular and connected concentrically around the first application unit 1 or the second application unit 2. In some embodiments, the deburring tool may take the form of a singular projection from the exterior of the first application unit 1 or the second application unit 2, as desired in various embodiments.

Although the invention has been explained in relation to its preferred embodiment, it is to be understood that many other possible modifications and variations can be made without departing from the spirit and scope of the invention as hereinafter claimed.

What is claimed is:

1. A lateral applicator kit for a pipe comprising:
    a first application unit, wherein the first application unit allows a primer material to be applied to an exterior lateral surface of the pipe;
    a second application unit, wherein the second application unit allows a primer material to be applied to an interior lateral surface of the pipe;
    the first application unit being removably interfit with the second application unit;
    the first application unit comprising a first housing, an application receptacle, a first material reservoir, and a first supply engagement feature;
    the application receptacle being integrated into the first housing;
    the first supply engagement feature being integrated into the first housing, opposite the application receptacle;
    the first material reservoir being positioned within the first housing between the first supply engagement feature and the application receptacle;

the application receptacle comprising a first applicator wall, at least one first application opening, and at least one first material applicator;

the at least one first application opening traversing through the first applicator wall;

the at least one first material applicator being positioned across one of the at least one first application opening;

the first supply engagement feature being in fluid communication with the at least one first application opening through the first material reservoir;

the second application unit comprising a second housing, an application body, a second material reservoir, and a second supply engagement feature;

the second supply engagement feature being integrated with the second housing;

the application body being connected to the second housing, opposite the second supply engagement feature;

the second material reservoir being positioned within the second housing;

the application body comprising a second applicator wall, at least one second application opening, and at least one second material applicator;

the at least one second application opening traversing through the second applicator wall;

the at least one second material applicator being positioned across one of the at least one second application opening; and the second supply engagement feature being in fluid communication with the at least one second application opening through the second material reservoir.

2. The lateral applicator kit for a pipe as claimed in claim 1 comprising:

the first application unit and the second application unit each having radial geometry concentrically positioned about a central axis.

3. The lateral applicator kit for a pipe as claimed in claim 1 comprising:

the first application unit being constructed of a flexible material.

4. The lateral applicator kit for a pipe as claimed in claim 1 comprising:

the second application unit being constructed of a flexible material.

5. The lateral applicator kit for a pipe as claimed in claim 1 comprising:

the at least one first material applicator being constructed of an absorbent material.

6. The lateral applicator kit for a pipe as claimed in claim 1 comprising:

the at least one second material applicator being constructed of an absorbent material.

7. The lateral applicator kit for a pipe as claimed in claim 1 comprising:

the first housing comprising a top, a bottom, and an outer shell;

the outer shell being perimetrically connected between the top of the first housing and the bottom of the first housing;

the application receptacle being integrated into the top; and the first supply engagement feature being integrated into the bottom.

8. The lateral applicator kit for a pipe as claimed in claim 1 comprising:

the first applicator wall being tapered outward toward a top of the first housing and constructed of a flexible material, wherein the application receptacle is configured to adaptably receive an exterior lateral surface of a pipe.

9. The lateral applicator kit for a pipe as claimed in claim 1 comprising:

the at least one first application opening being radially distributed about a central axis of the first application unit.

10. The lateral applicator kit for a pipe as claimed in claim 1 comprising:

the application receptacle further comprising a receptacle base; and the first applicator wall being perimetrically positioned to the receptacle base, opposite the first supply engagement feature.

11. The lateral applicator kit for a pipe as claimed in claim 10 comprising:

the first supply engagement feature traversing through the receptacle base; and a supply plug being adjustably engaged within the first supply engagement feature, wherein the supply plug is configured to regulate material flow through the first supply engagement feature.

12. The lateral applicator kit for a pipe as claimed in claim 1 comprising:

the at least one first application opening comprising a lateral portion and a terminal portion;

the lateral portion traversing through the first applicator wall; and the terminal portion traversing through a receptacle base of the application receptacle.

13. The lateral applicator kit for a pipe as claimed in claim 1 comprising:

the first application unit further comprising at least one pair of internal baffles; and the at least one pair of internal baffles being positioned within the first material reservoir and adjacent to one of the at least one first application opening.

14. The lateral applicator kit for a pipe as claimed in claim 1 comprising:

the application body of the second application unit further comprising a supply container, a plurality of distributing supply holes, and a distributing cavity;

the second supply engagement feature being in fluid communication with the supply container;

the second material reservoir being positioned around the supply container adjacent to the second supply engagement feature;

the plurality of distributing supply holes traversing through the supply container into the second material reservoir;

the distributing cavity being positioned between the second applicator wall and the supply container, adjacent to the second material reservoir opposite the second supply engagement feature; and the second material reservoir being in fluid communication with the distributing cavity, wherein the second supply engagement feature is in fluid communication with the at least one second application opening through a supply cavity, the plurality of distributing supply holes, the second material reservoir, and the distributing cavity.

15. The lateral applicator kit for a pipe as claimed in claim 14 comprising:

the application body further comprising an applicator bottom;

the at least one second application opening comprising at least one upper opening and at least one lower opening;

the distributing cavity extending between the second material reservoir and the applicator bottom;

the at least one upper opening being positioned adjacent to the second material reservoir; and the at least one lower opening being positioned adjacent to the applicator bottom.

16. The lateral applicator kit for a pipe as claimed in claim 1 comprising:

the second application unit further comprising a top and an outer annular wall;

the outer annular wall being perimetrically connected to the top, around the second material reservoir and the application body; and the outer annular wall having a larger diameter than an outer shell of the first unit housing, wherein the outer annular wall of the second application unit is configured to sleeve the outer shell of the first application unit.

17. The lateral applicator kit for a pipe as claimed in claim 16 comprising:

the second material reservoir being positioned between the top and a distributing cavity of the application body.

* * * * *